United States Patent
Caron-Fellens et al.

(10) Patent No.: US 10,648,174 B2
(45) Date of Patent: May 12, 2020

(54) ARCHITECTURAL ASSEMBLY FORMING AN ELECTROMAGNETIC RADIATION SHIELDING

(71) Applicants: SPIE BATIGNOLLES GENIE CIVIL, Boulogne-billancourt (FR); EUROMC, Stains (FR)

(72) Inventors: Jean-Paul Caron-Fellens, Saint Cloud (FR); Michel Mardiguian, Saint-remy les Chevreuse (FR); Thierry Pitoux, Fresnes (FR); Guillaume Souliac, Paris (FR)

(73) Assignees: SPIE BATIGNOLLES GENIE CIVIL, Boulogne-Billancourt (FR); LERAU, Stains (FR)

( * ) Notice: Subject to any disclaimer, the term of this patent is extended or adjusted under 35 U.S.C. 154(b) by 0 days.

(21) Appl. No.: 15/776,764

(22) PCT Filed: Feb. 3, 2017

(86) PCT No.: PCT/FR2017/050244
§ 371 (c)(1),
(2) Date: May 16, 2018

(87) PCT Pub. No.: WO2017/140966
PCT Pub. Date: Aug. 24, 2017

(65) Prior Publication Data
US 2018/0347184 A1 Dec. 6, 2018

(30) Foreign Application Priority Data
Feb. 17, 2016 (FR) ...................................... 16 51289

(51) Int. Cl.
*E04B 1/92* (2006.01)
*B32B 13/02* (2006.01)
(Continued)

(52) U.S. Cl.
CPC ................ *E04B 1/92* (2013.01); *B32B 5/028* (2013.01); *B32B 13/02* (2013.01); *B32B 13/06* (2013.01);
(Continued)

(58) Field of Classification Search
CPC ........ E04B 1/14; E04B 1/92; E04B 2001/925; E04C 2/28; B32B 2307/212; G21F 1/04
See application file for complete search history.

(56) References Cited

U.S. PATENT DOCUMENTS 4,932,180 A * 6/1990 Takahashi ................. E04B 1/92
174/384
5,611,183 A * 3/1997 Kim ........................ E04B 2/845
52/357
(Continued)

FOREIGN PATENT DOCUMENTS

DE 2426890 A1 * 12/1974 ............. H05K 9/009
DE 19942882 A1 * 6/2001 ............... A61N 1/16
(Continued)

*Primary Examiner* — Christine T Cajilig
(74) *Attorney, Agent, or Firm* — Bachman & LaPointe, P.C.

(57) ABSTRACT

The invention relates to an architectural assembly consisting of wall elements made of concrete containing conductive particles with a conductive mesh forming an electromagnetic radiation shielding. Said wall elements consist of a panel 1 made of concrete containing conductive particles without a conductive mesh, at least one face of which is provided with a skin 2, 3 comprising a conductive mesh, with meshes being less than 30×30 mm in dimensions.

10 Claims, 3 Drawing Sheets

(51) Int. Cl.
  *C04B 28/02* (2006.01)
  *E04C 2/04* (2006.01)
  *E04B 1/04* (2006.01)
  *B32B 15/18* (2006.01)
  *B32B 15/02* (2006.01)
  *B32B 5/02* (2006.01)
  *B32B 13/06* (2006.01)
  *E04B 1/14* (2006.01)
  *E04C 2/28* (2006.01)
  *C04B 111/94* (2006.01)
(52) U.S. Cl.
  CPC ............ *B32B 15/02* (2013.01); *B32B 15/18* (2013.01); *C04B 28/02* (2013.01); *E04B 1/04* (2013.01); *E04B 1/14* (2013.01); *E04C 2/044* (2013.01); *E04C 2/28* (2013.01); *B32B 2250/03* (2013.01); *B32B 2250/40* (2013.01); *B32B 2262/103* (2013.01); *B32B 2264/105* (2013.01); *B32B 2307/202* (2013.01); *B32B 2307/212* (2013.01); *B32B 2419/00* (2013.01); *B32B 2607/00* (2013.01); *C04B 2111/94* (2013.01); *E04B 2001/925* (2013.01)

(56) References Cited

U.S. PATENT DOCUMENTS

| | | | | |
|---|---|---|---|---|
| 5,722,198 A | * | 3/1998 | Bader | E04B 1/14 52/309.4 |
| 5,908,584 A | * | 6/1999 | Bennett | C04B 14/022 250/515.1 |
| 2016/0234977 A1 | * | 8/2016 | Tuan | H05K 9/0003 |

FOREIGN PATENT DOCUMENTS

| | | | | |
|---|---|---|---|---|
| EP | 0745061 B1 | * | 4/1999 | ............ C04B 28/02 |
| FR | 2052044 A5 | * | 4/1971 | ............ E04B 1/92 |
| GB | 835003 A | * | 5/1960 | ............ E04C 2/28 |
| WO | WO-2012114448 A1 | * | 8/2012 | ......... H05K 9/0003 |
| WO | WO-2013168301 A1 | * | 11/2013 | ......... H05K 9/0003 |

* cited by examiner

ARCHITECTURAL ASSEMBLY FORMING AN ELECTROMAGNETIC RADIATION SHIELDING

BACKGROUND OF THE INVENTION

The present invention relates to the field of building or rehabilitation of housing or premises wherein persons live and/or equipment is stored, which have to be protected against electromagnetic waves, such as data processing or data storing centers, firms, offices, hospitals, dwellings. The building external envelope mainly consists of concrete, with a processing limiting the transmission of electromagnetic waves and forming an Electro Magnetic Protection (PEM). Such protection can be provided in two ways:

Protection against the intrusion of electromagnetic waves in premises;

Protection against the emission of electromagnetic waves, from the premises outwards.

For decades, protecting premises against radio-electric fields was required in very specific cases only: specialized measurements laboratories, premises on military sites with powerful transmitters, some premises in embassies or hospitals, etc.

From the end of the 90s on, the needs for a radio-electric protection of large premises (>30 m$^2$) even full buildings have grown. They originate from a better knowledge of threats entailed in high frequency strong fields, on civilian or military sites. The so-called anti-compromise protection or electromagnetic spying protection.

Other threats have been added to these potential threats: modern radio-electric weapons, which generate very strong fields (>1,000V/m) as ultra-short pulses (ultra wide band pulses) or a highly-pinned microwave beam (Hi-Power MicroWaves). Technological progress made such weapons easy to use by conventional belligerents or terrorists.

State of the Art

A first protection mode is known in the state of the art, which consists in providing a Faraday cage, which surrounds the room or the building desired to be sealed or protected from electromagnetic waves.

When the external envelope of the premises mainly consists of concrete, the Faraday cage is, in most cases, a coating consisting of a metallic layer which is added to the wall of the premises desired to be protected. Such metallic layer, often made of copper, is relatively expensive.

A second solution consists in integrating metallic fillers into concrete in order to increase the absorption rate of concrete used for building the enclosure. Introducing metallic particles into concrete originally aims at modifying the mechanical behaviour characteristics of concrete, as explained in the article published in «Béton[s]» magazine, dated April-March 2013, and entitled «Les fibres métalliques» by Frédéric Cluzicki.

A third family of solutions, corresponding to the closest state of the art, consists in combining the use of a metallic layer, specifically as a grid, with the use of concrete containing metallic fillers.

For instance, the international patent application WO 2012114448 discloses a reinforced concrete building that exhibits a function of electromagnetic wave shielding against electromagnetic waves. This RC wall attenuates electromagnetic waves with the frequency to be shielded that propagate from the interior space (R1) toward the exterior space (R2). It consists of a concrete section the width direction of which coincides with the propagating direction from the interior space toward the exterior space, a front-side rebar grid on the interior space side of the concrete section, a rear-side rebar grid on the exterior space side, and a welded wire mesh that is provided between the front-side rebar grid and the rear-side rebar grid.

The distances between the rebar planes and the welded wire mesh in the propagation direction are adjusted to become an integral multiple of one wavelength of the frequency to be shielded, and the spacing within the front-side rebar grid and the rear-side rebar grid is adjusted to become 3 times as wide as the spacing within the welded wire mesh.

Such solution is adapted to the protection of radiation having a specific wavelength and does not enable a "wideband" protection.

The Chinese patent CN 103903665 relates to a cement mortar wideband shielding/microwave absorbing composite structure building material with metal net and electromagnetic function. The metallic mesh is embedded in the cement mortar.

The Japanese patent JPH01302897 discloses another solution for a structure which can stop radio waves.

It provides to use materials as a similar grid, with high conductivity, connected and positioned inside the concrete containing a conductive element, i.e. as particles, powder or pellets mixed with concrete in a volume ratio ranging from 1 to 3%.

The shielding panel is formed by adding steel or similar particles to plain concrete. The core materials such as iron or similar rods or grids are embedded in concrete. Frame elements consisting of angle irons or similar are provided on a peripheral edge portion. Individual panels are connected together, whereas frame elements are assembled using coupling bolts or the like.

The international patent application WO2014/210007 discloses another exemplary solution of the prior art, where the metallic mesh is embedded in a volume of concrete containing metallic fibres. Paragraph [0006] of the above-mentioned patent application says «concrete structure formed using conductive concrete mixture and conductive screens.» and paragraph [0019] says «The conductive concrete mixture also includes one or more conductive materials configured to furnish electrical conductivity to the concrete. The conductive material serves to provide EMP shielding and reflect and absorb, for instance, EM waves propagating through the conductive concrete mixture. For example, the conductive concrete mixture may include at least substantially uniformly distributed conductive materials, which may include metallic and possibly non-metallic conductive materials, such as metal and/or carbon fibers.».

Another similar solution is provided in the Japanese patent JPH05222785, which relates to the execution of armouring on a wide range, from a low frequency band to a high frequency band, and reducing shielding operations.

Shielding is provided by an electromagnetic protection element during the installation in a portion of a concrete conductive wall.

Concrete consists in a mixture with a particle of carbon or the like, and a metallic mesh is integrated in the conductive concrete to provide electrical connection between the electromagnetic shielding element and the conductive concrete.

The American patent U.S. Pat. No. 5,908,584 is also known in the state of the art, and discloses an electrically conductive material used for shielding against electromagnetic waves and comprising a binder, a mixture of graphite and amorphous carbon, and sand.

The European patent application EP0745061 is also known, which discloses a conductive cement-based composition exhibiting both good electrical conductivity and mechanical strength with dispersion of conductive phase within the composition.

The wide ranges of contents in the conductive composition are as follows: a cement-based binder, a conductive phase consisting of one or more of the following elements: conductive fibres in an amount of 0 to 15% by volume of the composition; conductive particles in an amount of 0 to 80% by volume of the composition; water, with a ratio, by weight, to the cement binder of 0.2 to 0.75, fine aggregates with a ratio, by weight, to the cement binder of 0.0 to 2.0, and coarse aggregates with a ratio, by weight, to the cement binder of 0.0 to 2.0, conventional additives or mixtures and a dispersing agent, if need be.

Drawbacks of the Prior Art

When shielding large dimension premises, the solutions like a Faraday cage using a sealed coating of six faces with steel or copper sheets become very expensive as regards materials as well as labour, all the more so since they are implemented as light work, once the main building is elevated. Besides, the protected premises is always provided with passages for persons and most often with passages for fluids (water, air, high power, low power).

The third family solutions, which consist in embedding a metallic grid in concrete containing particles are not easily implemented: concrete is filled with layers, the density of which gradually increases in the wall thickness. Besides, such solutions are based on the partial absorption of electromagnetic waves by concrete containing conductive particles increased by the reflection on the metallic mesh embedded in such filled concrete.

The efficiency of absorption is however limited for thin walls, and the mesh embedded in the concrete core is less efficient than when laid on a surface.

SUMMARY OF THE INVENTION

The solution which is the object of the present invention makes it possible to build a construction, the whole or a part of which reveals shielding performances which are by far sufficient for the above-mentioned needs, using techniques which do not really weigh on conventional methods.

Besides, the invention provides for a solution, the principle of which is not based on the absorption of electromagnetic waves only but on an optimum reflection of waves thanks to a large impedance mismatch at the air/wall interface.

The technical problem which has been solved by the invention is the improvement in the shielding efficiency relative to the solutions mentioned in the state of the art, which provides for embedding a metallic mesh within concrete which may contain conductive particles.

For this purpose, the invention, in its broadest sense, relates to an architectural assembly consisting of wall elements made of concrete containing conductive particles with a conductive mesh forming an electromagnetic radiation shielding, characterized in that said wall elements consist of a panel made of concrete containing conductive particles without a conductive mesh, at least one face of which is provided with a skin comprising a conductive mesh, with meshes being less than 30×30 mm in dimensions.

According to a first alternative solution, said conductive mesh is fastened to at least one of the surfaces of said panel made of concrete containing conductive particles.

According to a second alternative solution, said conductive mesh is embedded in a finishing material.

According to a third alternative solution, said conductive mesh is embedded in concrete containing conductive particles.

Concrete preferably contains from 0.5 to 2% by weight of conductive particles.

Advantageously, concrete has a resistivity of less than 300 Ohmmeter, which corresponds to the resistivity of standard concrete.

Concrete preferably contains conductive particles having a length from 5 to 15 mm and a section from 0.1 to 0.5 mm.

According to a preferred alternative solution, the openings are surrounded with a metal conductive sheath having a hem folded onto the metallic mesh.

According to one preferred embodiment, said sheaths are made integral with the wall using screws engaged in tapped holes to provide a mechanical and electrical connection with the mesh and concrete containing conductive particles.

Said wall elements are advantageously connected together by means of expansion joints made of a conductive material, made integral with the peripheral areas of the two elements connected by concrete screws or nails to provide a mechanical and electrical connection with the mesh and concrete containing conductive particles.

The invention also relates to a method for building an architectural assembly consisting of wall elements made of concrete containing conductive particles with a conductive mesh forming an electromagnetic radiation shielding, characterized in that a skin comprising a conductive mesh with meshes being less than 30×30 mm in dimensions is placed on at least one of the faces of a wall element made of concrete containing conductive particles without a conductive mesh.

Said skin advantageously consists of a mesh embedded or not in a finishing material.

BRIEF DESCRIPTION OF THE DRAWINGS

The present invention will be best understood when reading the following detailed description of a non-restrictive exemplary embodiment, while referring to the appended drawings, wherein.

The object of the present invention is the building of a construction limiting the propagation of electromagnetic waves in a large frequency band, from the inside outwards and/or from the outside inwards.

DETAILED DESCRIPTION

Figure 1:
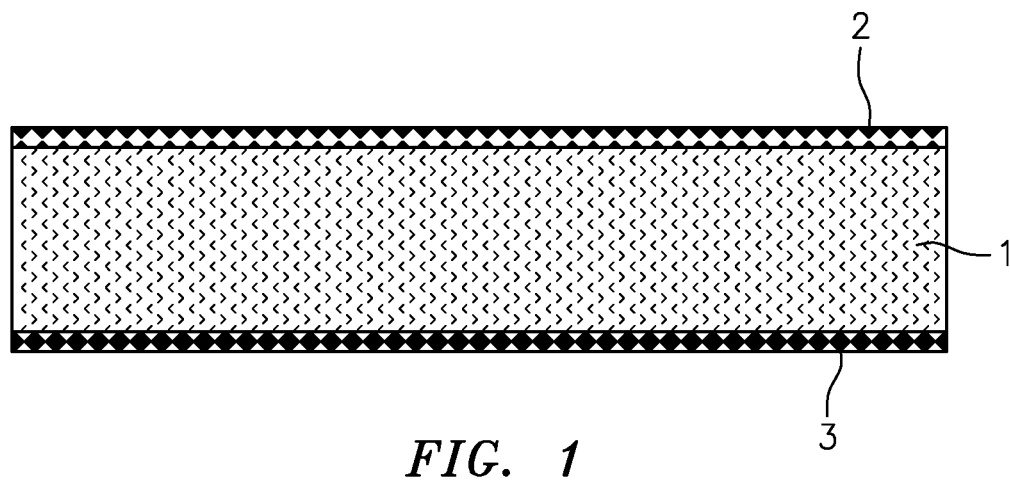
FIG. 1 shows a sectional view of a panel element according to the invention.

FIG. 1 shows a sectional view of an exemplary embodiment of a panel element according to the invention.

It consists of a panel 1 made of concrete containing conductive particles. In the example disclosed, such particles consist of metallic fibres, 13 mm long and 0.2 mm in section. Concentration amounts to 20 kg per square meter of concrete. The panel 1 is 35 cm thick. It contains no electromagnetic shielding metallic mesh. This does not exclude the presence of metallic reinforcements or reinforcement bars for making the reinforced concrete. On the contrary, the panel 1 comprises no mesh, having small-sized meshes, with sides of less than 70 mm.

In the example disclosed, the panel 1 is coated with an internal skin 2 and an external skin 3. The thickness of such skin is 20 mm in the example disclosed.

The thickness of the panel 1 is above 80% of the total thickness of the panel element, with each skin 2, 3 having a thickness of less than 10% of the thickness of the panel 1.

Such skins 2, 3 contain a conductive mesh.

"Mesh" means a bidimensional assembly of conductors having an electrical continuity of conduction at the intersections of the interleaved conductors. Such mesh may also consist of a metallic gauze fixed by rivets or staples on the panel made of concrete containing conductive particles.

It may also be integrated in a finishing material or a layer of concrete placed on the panel 1.

The performances of a shielded volume are measured through the ratio between the field in the concerned area, without shielding, and the field remaining when shielding is provided. I.e., in decibels:

$Eff. (dB) = 20 \cdot \log [E1 (Volt/m)/E2 (Volt/m)]$

Reference is more simply made to attenuation between the "outside" field and the "inside" field, although such expressions are not rigorous.

To obtain such attenuation, the wall must be made of a conductive material, with a nature and a thickness suitable for the expressed needs.

Figure 2:
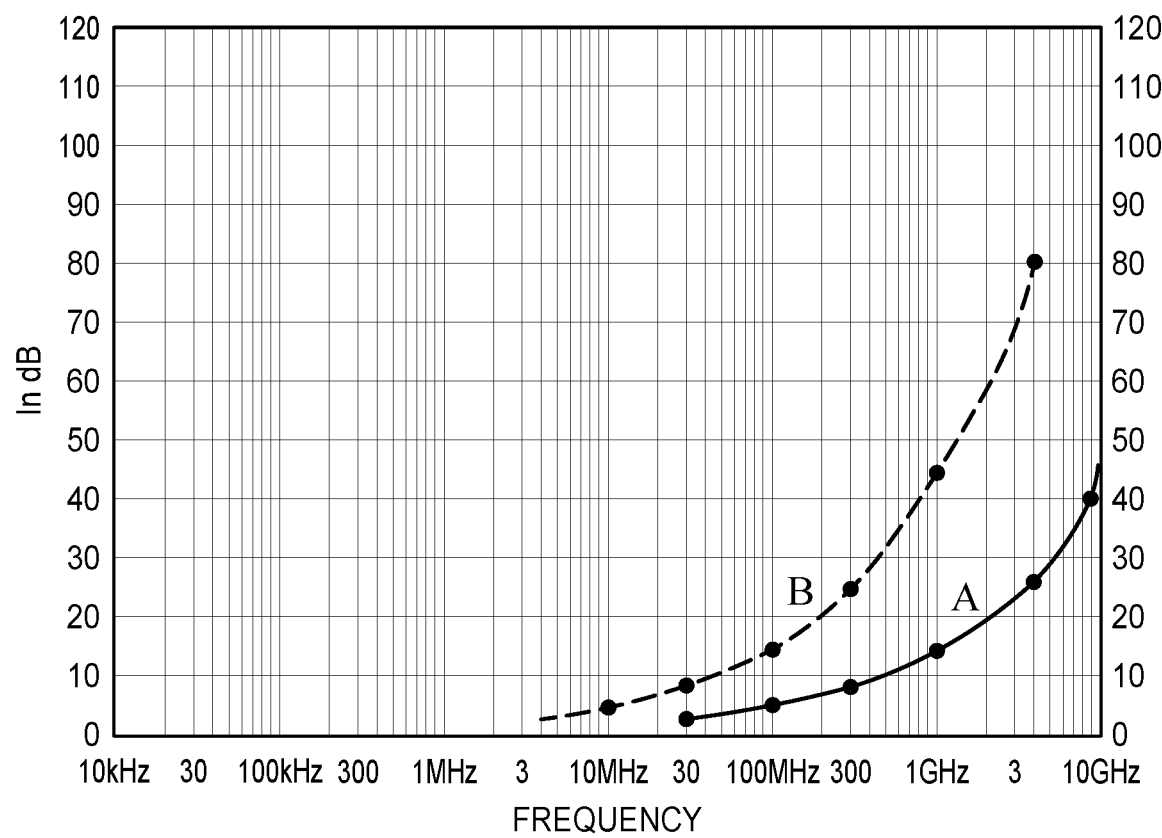
FIG. 2 shows the attenuation curves computed by absorption of a 0.50 m thick concrete. (A) curve: plain concrete, (B) curve: concrete added with steel fibres

Concrete with the usual cement/sand proportions, is a poor conductor. When thick enough, though, the skin effect results in the electromagnetic waves above a certain frequency going less and less deep into the wall thickness: concrete starts to absorb them. FIG. 2 shows the attenuation curves computed by absorption of a 0.50 m thick concrete. (A) curve: plain concrete, (B) curve, addition of steel fibres for a 0.50 m thick homogeneous concrete wall (resistivity 300 $\Omega \cdot m$).

If concrete contains steel fibres in a suitable proportion, resistivity may be 30 $\Omega \cdot m$. With a low concentration conductive filler, concrete, which was nearly radio wave transparent up to ≈100 MHz starts providing significant attenuation (B curve, 15 dB) at the same frequency and becomes more and more efficient beyond.

The only conductive filler does not make it possible, however, to give satisfactory performances at low frequencies, of less than 100 MHz, which correspond to radio transmission of ultra-short or metric waves.

Unlike concrete, a metallic mesh opposes a very conductive surface to the incident electromagnetic wave. The latter is strongly reflected because of the sudden change in impedance, like optical reflection. When frequency increases, though, the efficiency of the grid decreases since the length of the incident field wavelength decreases and gets closer to the mesh dimension. When such mesh is equivalent to a half wavelength, the grid acts as a perfectly tuned aerial and lets the whole field through. Beyond, it will remain nearly transparent (FIG. 2).

The invention is based on the general principle of a combination of fibrous concrete with a conductive grid.

Figure 3:
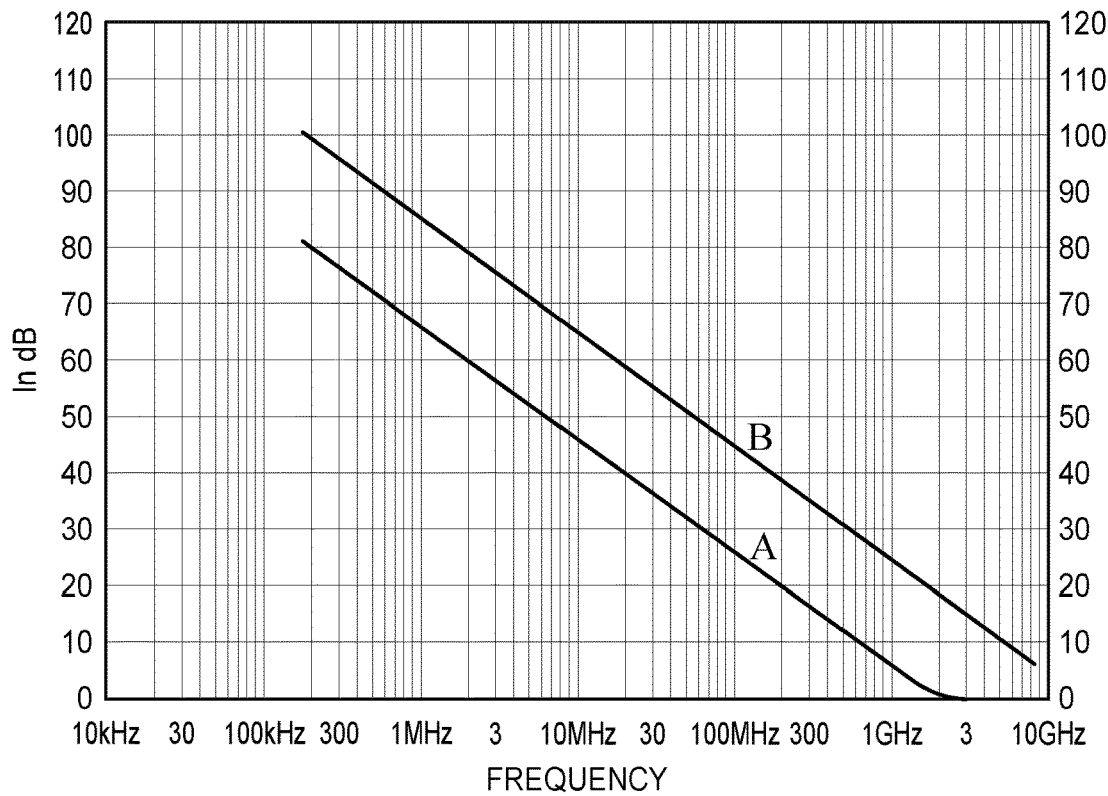
FIG. 3 shows the attenuation curves of a single layer of a steel grid, welded at (A) 50 mm grid, (B) 5 mm grid intersections
Figure 4:
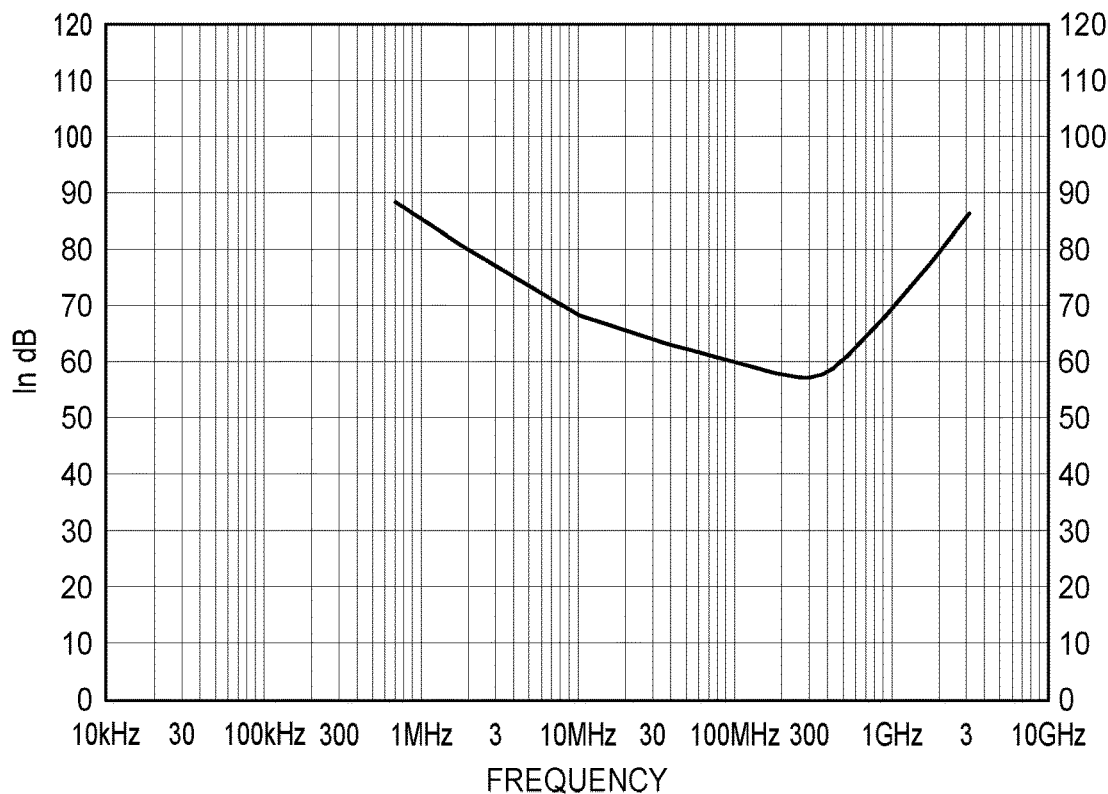
FIG. 4 shows the attenuation curves obtained when combining a layer of a 5 mm steel grid and a wall made of 0.50 m fibrous concrete

FIGS. 3 and 4 show the attenuation rate of one single layer of steel grid, welded at the 50 mm grid (A), 5 mm grid (B) intersections (FIG. 3) and the attenuation rate obtained by combining a layer of 5 mm steel grid, and a 0.50 m fibrous concrete wall (FIG. 4).

When associating at best the properties of HF absorbing fibrous concrete, and those of a low frequency-efficient mesh, which gradually loses this advantage when frequency increases, premises can be built, the walls of which will sufficiently attenuate the electromagnetic fields in a very wide frequency range. FIG. 3 shows that combining a 5 mm mesh with 0.50 mm fibrous concrete guarantees at least 60 dB, from 1 MHz up to >10 GHz.

In the left part of the curve, the mesh mainly provides attenuation, and filled concrete takes over from 150 MHz.

In the solutions of the prior art, where a grid is embedded in concrete, the performance is inadequate. The invention, which consists in forming, on a panel filled with conductive particles without any conductive mesh, and in positioning a conductive mesh on such panel, makes it possible to significantly improve such performances.

If the grid is embedded in the mesh thickness, the mismatch between the incident field and the impedance of the mesh is less favourable. Calculation shows that fibrous concrete with a resistivity of 30 $\Omega \cdot m$ starts participating in the shielding around 50-100 MHz; it has then reached its characteristic impedance Zc of about 100$\Omega$. If the mesh is embedded, the field which hits it is no longer a field in the air (with Zc=377$\Omega$) but a field in a slightly conductive medium. This results in the reflection loss of the field on the mesh no longer being proportional to Zc (air)/Zmesh, but to Zc (concrete)/Z(mesh). This less sharp transition causes a loss of a 4 factor in the expected attenuation by the mesh.

On the contrary, if, as provided by the invention, the mesh is on a surface, the first air-mesh interface is significantly mismatched and the reflection loss is maximum. Such advantage is particularly crucial if the sources of the radiated field desired to be attenuated are close to (for instance less than a few meters away from) the wall. Now this is exactly the case when the shielding of the premises must provide anti-compromise protection (a protection against electromagnetic spying). The attenuation of a mesh in a close magnetic field is then no longer as good as relative to distant sources. It is thus essential, in such applications, to maintain the best possible performances of the mesh.

When the mesh is embedded in concrete, casting a wall in several operations, or assembling several prefabricated panels then rises the delicate issue of the edge-to-edge positioning, without any electrical discontinuity, of the grid elements, on the 4 sides. Any discontinuity (for instance staples here and there) ruins the efficiency of the mesh by creating a long slot, and thus leakage. On the contrary, laying the mesh on a surface with a continuous metal-metal contact is easily provided by lapped panels, like wall paper.

To obtain "intelligent concrete", the characteristics of which can be adjusted beforehand to obtain given performances, the invention consists in acting on three easily controlled parameters:

concrete thickness,
proportion of conductive particles,
nature of such particles,
dimension of the meshes in the mesh.

Laying the mesh on a surface facilitates the adaptation of through elements:

ventilation ducts,
cable bushings and fluid conduits,
door jambs and armor panes, etc. . . .

Figure 5:
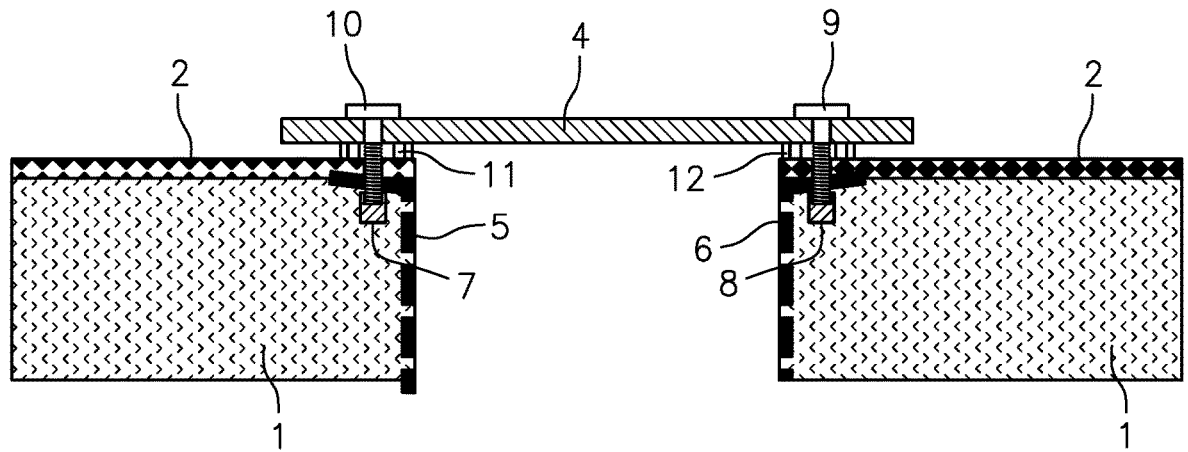
FIG. 5 shows a sectional view of the opening provided in one panel

When building, processing wall elements is not enough. The transmission of electromagnetic waves through openings, or panel junctions also has to be limited. FIG. 5 represents a schematic view of one opening.

Openings more particularly relate to doors, windows, passages for conduits, cables and fluid pipes, ventilation ducts, etc.

The closing element 4, for instance a bushing panel, is attached to the periphery of the opening provided in the panel.

A conductive sheath 5, 6 is positioned on the edge of each panel element. Such panel 5, 6 consists of a metal sheet with a thickness greater than or equal to 0.5 millimeters.

The walls made of concrete containing conductive particles 1 are provided with a hole wherein a metal peg 7, 8 is accommodated.

The screws 9, 10 ensure the electrical and mechanical connection of the closing element 4 via the pegs 7, 8 with the sheath 5, 6 and the mesh 2. A conductive joint 11, 12 is inserted between the sheath 5, 6 and the closing element 4.

Figure 6:
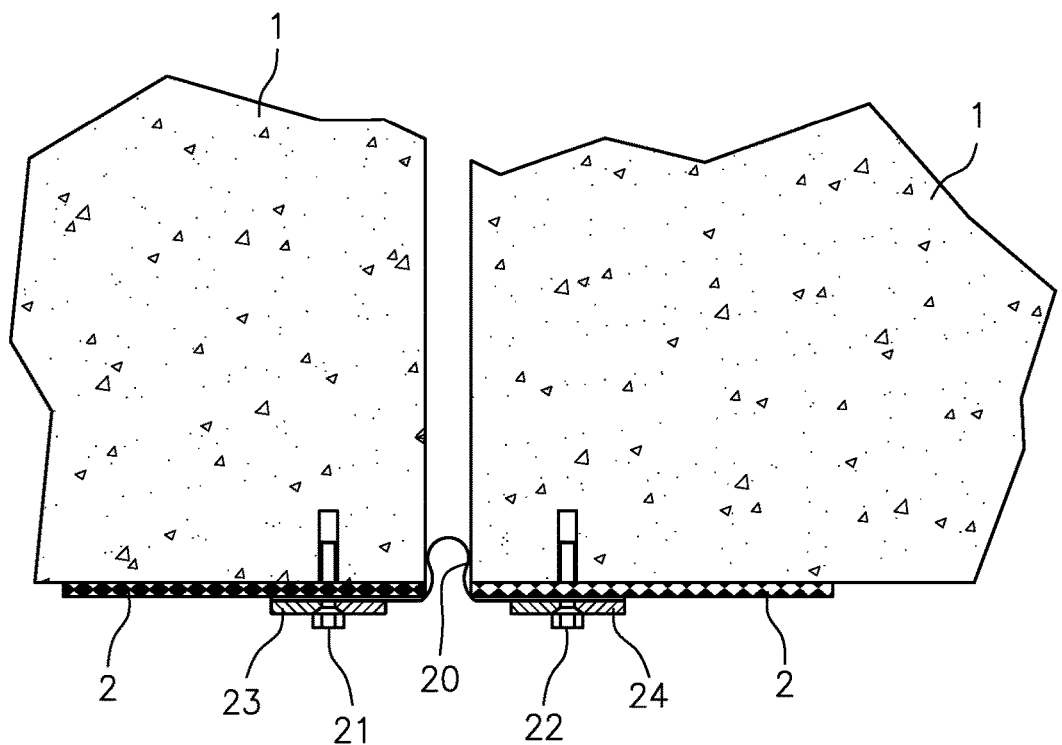
FIG. 6 shows a sectional view of the connection between two panels.

FIG. 6 shows a sectional view of a junction between two panel elements. A metal strap 20 consisting of a thin conductive sheet having an omega-shaped section is attached by concrete screws or nails 21, 22 and steel bands 23, 24.

Additionally, such metal strap 20 enables the shielding to follow the variations in the spacing of the expansion joint between the two panel elements.

In the case of oblique angles of incidence, the electromagnetic wave may meet only a small concrete thickness, or even no thickness at all, at the openings in the concrete panel+mesh.

As the conductive mesh cannot provide high frequency protection alone, the opening edge must be equipped with a conductive coating having an attenuation at least equal to that of the selected filled concrete thickness. Such "sheath" may be made of sheet metal, metal strap, metal cloth or conductive paint; a 90° return must provide continuity with the mesh.

The wall characteristics are as follows:
Resistivity of fibrous concrete≤30 Ω·m (an order of magnitude of the "Alluets" type mix)
Dielectric constant: 10
i.e. a wall characteristic impedance≈120Ω, constant for ≥100 MHz
Steel-mesh size: 5×5 mm mesh
Target performances (application of CEI 61000 Standard entitled Electromagnetic Compatibility (CEM)):
Effects of the electromagnetic pulses at high altitude (IEM-HA): 50 kV/m peak. Rt: 2.5 ns, duration 50%: 25 ns
High Intensity Radiation Field (HIRF): up to 10 kV/m peak, 30 MHz at 5 GHz
attenuation 50 dB on the whole 0.1 MHz spectrum at at least 5 GHz With such an attenuation, the residual fields will be:
IEMN≤160V/m peak pulse
HIRF≤33V/m
With such an attenuation, the residual fields are:
Effects of the electromagnetic pulses at high altitude (IEM-HA)≤160V/m peak pulse
HIRF≤33V/m Such values entail no risk of serious damage or failure to equipment which would at least comply with the CEM European directive, in the Industrial Severity category.

Results

|  | F (MHz) | | | | | | | |
| --- | --- | --- | --- | --- | --- | --- | --- | --- |
|  | 0.1 | 1 | 10 | 30 | 100 | 300 | 1,000 | 3,000 |
| Concrete skin depth of | 8.5 | 2.7 | 0.85 | 0.5 | 0.27 | 0.16 | 0.085 | 0.05 |
| Absorption for 0.50 m (dB) | 0.5 | 1.6 | 5.1 | 8.7 | 16 | 27 | 51 | 87 |
| Absorption for 1 m (dB) | 1 | 3.2 | 10 | 17.4 | 32 | 54 | 102 | 174 |
| 5 × 5 mm mesh (dB) | 96 | 76 | 56 | 46 | 36 | 26 | 16 | 6 |
| Total attenuation (dB) with a 0.50 m wall: | 96.5 | 77.5 | 61 | 54.7 | 52 | 53 | 67 | 93 |
| with a 1 m wall | 97 | 79 | 66 | 63.4 | 68 | 80 | 118 | 180 |

The wall attenuation will combine with that of the secondary elements (doors, ventilation, etc.) which also have to comply with the >50 dB requirement.

Positioning the grid on the surface instead of embedding it within concrete wins 6 dB thanks to a better field/grid impedance mismatch.

The invention claimed is:

1. An architectural assembly comprising:
    wall elements having a panel made of concrete containing conductive particles, the panel having at least one face on a surface coated with at least one skin comprising a conductive mesh forming a broadband electromagnetic radiation shielding, with each unit of the conductive mesh being less than 30×30 mm in dimensions.

2. The architectural assembly according to claim 1, wherein said conductive mesh is fastened to at least one of the surfaces of said panel made of concrete containing conductive particles.

3. The architectural assembly according to claim 1, wherein said concrete contains from 0.5 to 2% by weight of conductive particles.

4. The architectural assembly according to claim 1, wherein the concrete has a resistivity of less than 300 Ohmmeter.

5. The architectural assembly according to claim 1, wherein the concrete contains conductive particles having a length from 5 to 15 mm and a section from 0.1 to 0.5 mm.

6. The architectural assembly according to claim 1, wherein the panel comprises openings that are surrounded with a metal conductive sheath.

7. The architectural assembly according to claim 6, wherein said metal conductive sheath is made integral with the wall using screws engaged in tapped holes to provide a mechanical and electrical connection with the conductive mesh and the concrete containing conductive particles.

8. The architectural assembly according to claim 1, wherein said wall elements are connected together by means of expansion joints made of a conductive material, made integral with the peripheral areas of the two elements connected by concrete screws or nails to provide a mechanical and electrical connection with the mesh and concrete containing conductive particles.

9. A method for building an architectural assembly comprising:
   providing wall elements made of concrete containing conductive particles;
   forming a broadband electromagnetic radiation shielding with a panel coated with at least one skin comprising a conductive mesh, with each unit of the mesh being less than 30×30 mm in dimensions; and
   placing the conductive mesh on at least one face of the wall element made of concrete containing conductive particles in the absence of the conductive mesh being within the concrete containing conductive particles.

10. The method for building an architectural assembly according to claim 9, wherein said skin consists of the conductive mesh embedded in a finishing material.

* * * * *